(12) United States Patent
Mori et al.

(10) Patent No.: US 12,722,587 B2
(45) Date of Patent: Sep. 1, 2026

(54) VEHICLE BODY FRONT CONSTRUCTION

(71) Applicant: HONDA MOTOR CO., LTD., Tokyo (JP)

(72) Inventors: Masaki Mori, Tokyo (JP); Tetsuya Morino, Tokyo (JP); Momoka Fujii, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 614 days.

(21) Appl. No.: 18/191,150

(22) Filed: Mar. 28, 2023

(65) Prior Publication Data

US 2023/0311799 A1 Oct. 5, 2023

(30) Foreign Application Priority Data

Mar. 30, 2022 (JP) ................................ 2022-054919

(51) Int. Cl.

*B60R 19/48* (2006.01)
*B60Q 9/00* (2006.01)
*B60R 19/52* (2006.01)

(52) U.S. Cl.

CPC .............. *B60R 19/48* (2013.01); *B60Q 9/006* (2013.01); *B60R 19/483* (2013.01); *B60R 2019/527* (2013.01)

(58) Field of Classification Search

CPC ..... B60R 19/483; B60Q 9/006; G01S 13/931; G01S 2013/93271; G01S 2013/93275
See application file for complete search history.

(56) References Cited

U.S. PATENT DOCUMENTS 9,004,578 B1 4/2015 Ghannam et al.
2008/0179900 A1 7/2008 Hartley et al.
2014/0355382 A1* 12/2014 Tsuji ...................... G01S 15/04 367/87
2016/0137230 A1* 5/2016 Taneda ................. G01S 13/931 296/193.09
2019/0161041 A1* 5/2019 Fernandez ............ B60R 19/023
2020/0094759 A1* 3/2020 Tanabe .................. B60R 13/105
2022/0365207 A1* 11/2022 Corner ................. H01Q 1/3233

FOREIGN PATENT DOCUMENTS

CN 101229798 A 7/2008
JP 2009-208500 A 9/2009
JP 2019-6217 A 1/2019

OTHER PUBLICATIONS

Chinese Office Action received in corresponding Chinese application No. 202310198863.3 dated Dec. 31, 2025 with English translation (15 pages).

* cited by examiner

*Primary Examiner* — Daniel J Colilla

(74) *Attorney, Agent, or Firm* — Rankin, Hill & Clark LLP

(57) ABSTRACT

A vehicle body front construction includes: a front bumper including an opening; an air guide member disposed behind the front bumper and configured to guide rearward outside air taken from the opening; and a sensor attached to the front bumper; and a sensor protection member disposed between the sensor and the air guide member. The sensor protection member includes: a protection wall extending in a width direction of a vehicle with a clearance between the sensor protection member and the air guide member; and a side wall extending forward from an end of the protection wall close to the opening. The side wall includes a front end positioned close to the front bumper.

7 Claims, 10 Drawing Sheets

10
2
11
5
7a
8
II
II
7
12
8
UPPER
LOWER
RIGHT
LEFT 6
4, 4c
13
14
15
8
2
21
10
RIGHT
REAR
FRONT
LEFT

UPPER
LOWER
REAR
FRONT
RIGHT
LEFT
10
6
6a
6a1
R
4c
13
8b
8
8a
4a
4
6b
6b1
4b

VEHICLE BODY FRONT CONSTRUCTION

This application claims the benefit of foreign priority to Japanese Patent Application No. 2022-0:54919, filed on Mar. 30, 2022, which is incorporated by reference in its entirety.

BACKGROUND

1. Field of the Disclosure

The present disclosure relates to a vehicle body front construction.

2. Description of the Related Art

Recent years, the effort to provide access to a sustainable transportation system considering traffic participants, especially vulnerable people such as elders and children, has been active. To this end, the research and development for further improvement in the safety and convenience of traffic through the development related to enhancement in the collision safety performance of a vehicle body have been focused.

Conventionally, there has been known a sensor arrangement structure in which a sensor for preventing a collision is arranged inside an upper member of a bumper (for example, see JP2009-208500A). Specifically, in this structure, the bumper includes the upper member and a lower member, and a coupler between the upper member and the lower member is arranged close to a vertical wall of a bumper beam.

According to the above structure, it is possible to avoid damage to the sensor even at the time of an unexpected collision by the coupler between the upper member and the lower member that is brought into contact with the vertical wall of the bumper beam.

SUMMARY

However, in the conventional structure (for example, see JP2009-208500A), the coupler between the upper member and the lower member needs to be arranged in a position facing the vertical wall of the bumper beam. For this reason, the conventional structure has a problem of restriction in the degree of freedom in the arrangement of the bumper beam and the design of the bumper.

Additionally, when this structure is applied to a vehicle body front portion, there are a cooler such as a radiator and an air guide member for guiding outside air to the cooler in an entering direction of the sensor at the time of a collision. For this reason, the conventional structure also has a problem that it is difficult to secure a space for arranging the sensor in the vehicle body front portion.

Therefore, the present disclosure is directed to a vehicle body front construction which protects a sensor at the time of a collision in a limited arrangement space without impairing the degree of freedom in the layout and the design of a bumper while enhancing the collision safety performance of a vehicle body. The present disclosure eventually contributes the development of a sustainable transportation system.

An aspect of the present disclosure provides a vehicle body front construction includes: a front bumper that includes an opening; an air guide member which is arranged behind the front bumper and guides rearward outside air taken from the opening; and a sensor which is attached to the front bumper; a sensor protection member disposed between the sensor and the air guide member. The sensor protection member includes: a protection wall which extends in a width direction of a vehicle with a clearance between the sensor protection member and the air guide member; and a side wall which extends forward from an end of the protection wall close to the opening. The side wall includes a front end positioned close to the front bumper.

According to the aspect, the vehicle body front construction protects a sensor upon a collision in a limited arrangement space without impairing the degree of freedom in the layout and the design of a bumper while enhancing the collision safety performance of a vehicle body.

DESCRIPTION OF THE EMBODIMENTS

Figure 1:
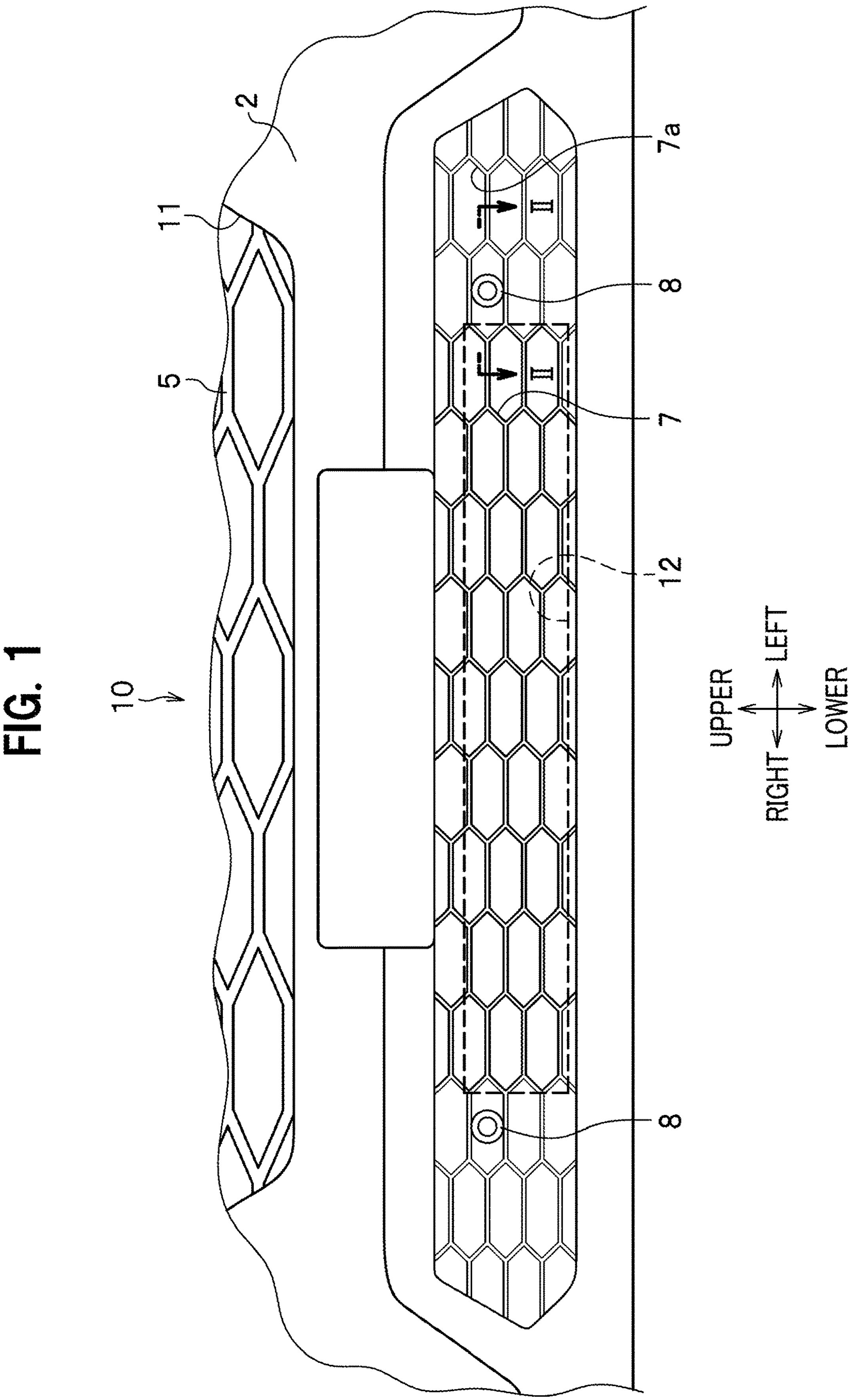
FIG. 1 is an enlarged view of a front portion of a vehicle body including a vehicle body front construction e according to an embodiment of the present disclosure.

Next, embodiments of a vehicle body front construction of the present disclosure will be described in detail with reference to the accompanying drawings as needed. Note that, front and rear, up and down, and right and left directions indicated by arrows in the drawings to be referred coincide with front and rear, up and down, and right and left directions of a vehicle body. Additionally, the right and left directions of the vehicle body may be referred to as a width direction of a vehicle or a vehicle width direction in the following descriptions.

The vehicle body front construction of the present embodiment is arranged on each of two sides on the right and left of the vehicle body so as to correspond to a parking sensor arranged on each of two sides on the right and left of a vehicle body front portion, and the vehicle body front constructions are horizontally symmetrical to each other. Therefore, in the present embodiment, only the vehicle body front construction on the left side will be described, and detailed descriptions of the vehicle body front construction on the right side are omitted.

Hereinafter, the vehicle body including the vehicle body front portion structure will be described first, and thereafter the vehicle body front construction will be described in detail.

<<Construction of Vehicle Body>>

Figure 2:
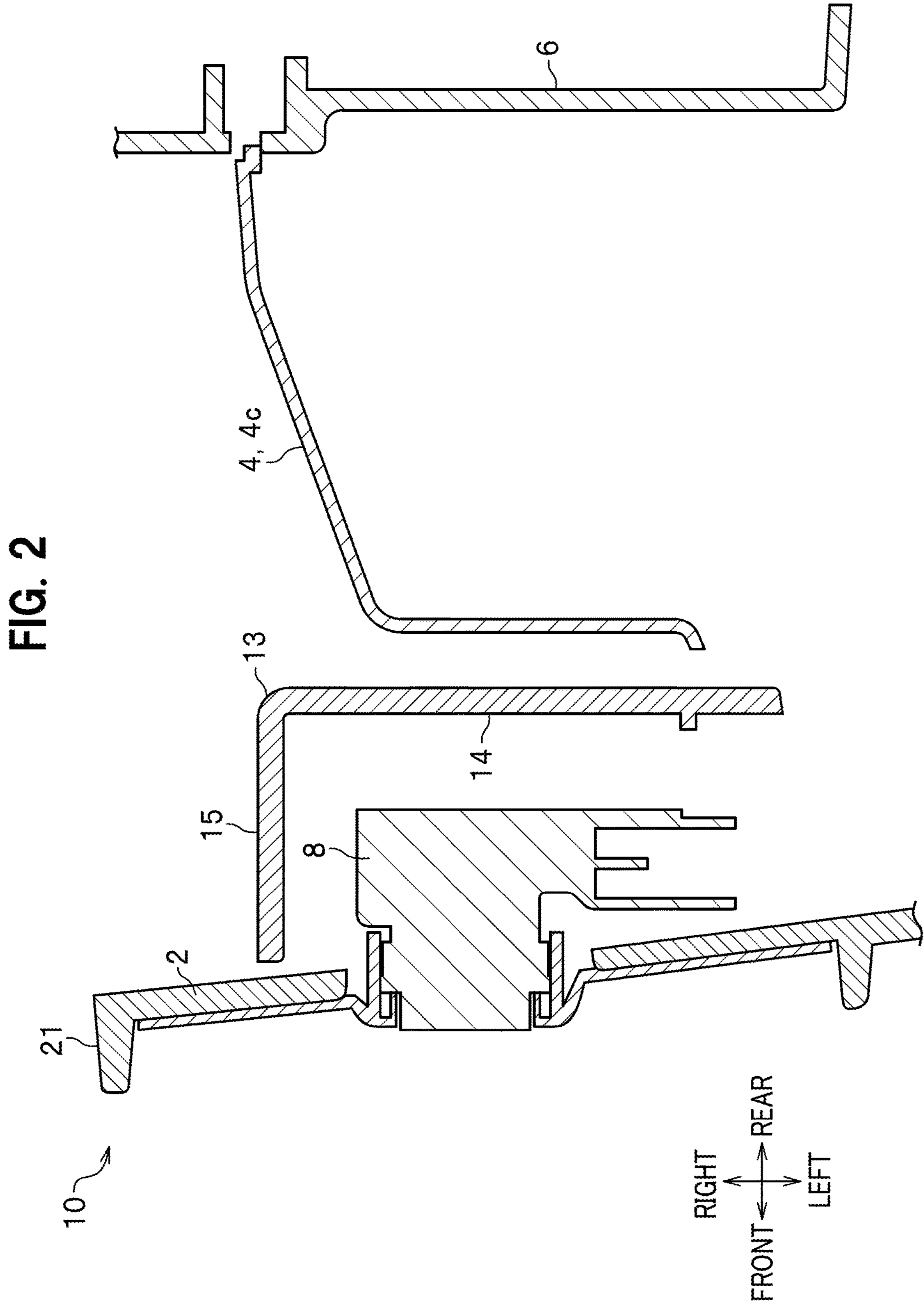
FIG. 2 is a cross-sectional view taken along II-II of FIG. 1.

FIG. 1 is a partial enlarged view of a front portion of a vehicle body 10. FIG. 2 is a cross-sectional view taken along II-II of FIG. 1.

As shown in FIG. 1, a front bumper (a front bumper face) 2 extends to the right and left at a front portion of the vehicle body 10. The front bumper 2 includes an upper opening 11 and a lower opening 12 formed thereon.

Note that, among the upper opening 11 and the lower opening 12, the lower opening 12 corresponds to an "opening" of the front bumper 2 in the scope of claims.

A front lower grill 7 including a honeycomb-shaped net is attached on the lower opening 12 (the opening) from a front side (a near side in the paper of FIG. 1) of the vehicle body 10. In FIG. 1, the lower opening 12 (the opening) is indicated by a hidden line (a dotted line) for convenience in drawing.

As shown in FIG. 1, the lower opening 12 of the present embodiment is formed in a center portion in the vehicle width direction on a lower side of the front bumper 2. The lower opening 12 has a rectangular shape extending in the vehicle width direction in the vehicle body front view shown in FIG. 1.

Note that, the lower opening 12 of the present embodiment is formed to be positioned below a bumper beam (not shown) extending in the vehicle width direction directly behind the front bumper 2.

As shown in FIG. 1, a parking sensor 8 is attached to the front bumper 2. The parking sensor 8 corresponds to a "sensor" in the scope of claims. However, the sensor in a vehicle body front portion construction 1 of the present embodiment is not limited to the parking sensor 8, and the type of the sensor is not particularly limited as long as it detects an object positioned in front of the vehicle body.

As shown in FIG. 1, the parking sensor 8 of the present embodiment is attached to the front bumper 2 to be adjacent to the lower opening 12 on an outer side of the lower opening 12 in the vehicle width direction. Note that, a net design 7*a* that is the same as the front lower grill 7 is applied to a lower portion of the front bumper 2 so as to be continuously integral with the front lower grill 7 of the lower opening 12 also in a predetermined range in which the lower opening 12 is not formed. The net design 7*a* includes ribs in the form of a net that are formed on a front surface of the front bumper 2. Thus, sufficient stiffness for resistance to a great wind pressure during traveling even with a reduced thickness is applied to the vicinity of the lower portion of the front bumper 2.

The upper opening 11 is formed to be positioned above the bumper beam (not shown). A front upper grill 5 including a honeycomb-shaped net is attached to the upper opening 11. Although it is not shown in the drawing, an admission mechanism for an internal-combustion engine and an air introduction mechanism for a cooling device are arranged behind the upper opening 11.

As shown in FIG. 2 that is the cross-sectional view taken along II-II of FIG. 1, the vehicle body 10 includes the front bumper 2 to which the parking sensor 8 is attached, a sensor protection member 13, an air guide member 4, and a grill shutter 6 in the order from the front side. Although it is not shown in the drawing, a lower portion of an assembly of a front bulkhead and a cooling device including a radiator is partially shown behind the grill shutter 6.

Note that, in FIG. 2, a reference sign 21 indicates an opening in the front bumper 2.

Figure 3:
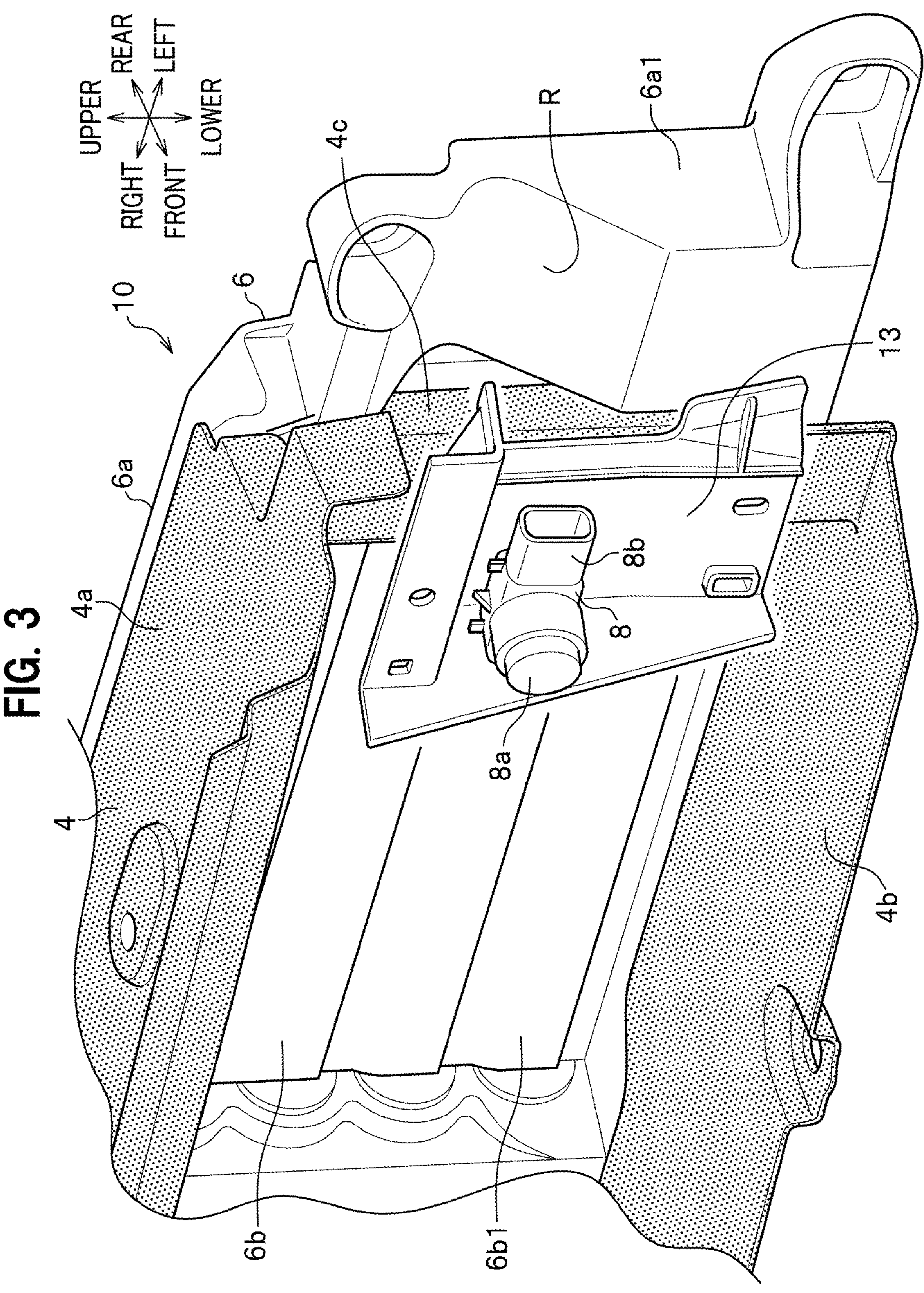
FIG. 3 is a perspective view showing arrangement of a sensor, a sensor protection member, an air guide member, and a grill shutter in the vehicle body front construction according to the embodiment of the present disclosure.

FIG. 3 is a perspective view showing arrangement of the parking sensor 8, the sensor protection member 13, the air guide member 4, and the grill shutter 6. Note that, for convenience in drawing, FIG. 3 shows that the front bumper 2 (see FIG. 2) is detached while the parking sensor 8 attached to the front bumper 2 (see FIG. 2) and the sensor protection member 13 are left closer to the vehicle body 10. In FIG. 3, the air guide member 4 is shaded so as to make the front and rear relationship between the sensor protection member 13 and the grill shutter 6 clear.

As shown in FIG. 3, the parking sensor 8 includes a sensor main portion 8*a* and a connector 8*b* that connects a harness including a power line, a signal line, and so on to the sensor main portion 8*a*. The sensor protection member 13 is formed of a plate body that protects the parking sensor 8 from behind. The parking sensor 8 and the sensor protection member 13 will be described later in detail.

As shown in FIG. 3, the air guide member 4 includes an upper regulation plate 4*a*, a lower regulation plate 4*b*, and a pair of side plates 4*c* connecting two end edges of the upper regulation plate 4*a* and the lower regulation plate 4*b* in the vehicle width direction. Note that FIG. 3 shows only the side plate 4*c* on the left side in the vehicle width direction out of the pair of the side plates 4*c*.

As shown in FIG. 2, the side plate 4*c* on the left side is inclined to be gradually displaced outward in the vehicle width direction (the left side in FIG. 2) as extending forward from a position close to the grill shutter 6. The side plate 4*c* on the left side is also bent to extend outward in the vehicle width direction (the left side in FIG. 2) along a rear surface of the sensor protection member 13 directly behind the sensor protection member 13.

Although it is not shown in the drawing, the air guide member 4 as described above has the shape of a duct formed of a rectangular tube body having a rectangular cross-section with the upper rectification plate 4*a*, the lower regulation plate 4*b*, and the pair of the side plates 4*c*.

The air guide member 4 shown in FIG. 3 is arranged in front of the grill shutter 6 so as to guide the wind during traveling flowing from the front lower grill 7 (see FIG. 1) to the opened grill shutter 6.

Note that, the air guide member 4 of the present embodiment is assumed to be formed of an elastic body and the like such as a flexible resin and a synthetic rubber. Above all, the air guide member 4 formed of resin is particularly preferable.

The grill shutter 6 (see FIG. 3) is arranged behind the lower opening 12 (see FIG. 1) to which the front lower grill 7 (see FIG. 1) is attached and in front of a lower portion of the radiator (not shown). As shown in FIG. 3, the grill shutter 6 of the present embodiment is assumed to include a frame body 6*a* fixed to the front bulkhead (not shown) and a shutter 6*b* supported by the frame body 6*a*.

As shown in FIG. 3, the shutter 6*b* mainly includes multiple shutting fins 6*b*1 which extends in the vehicle width direction inside the frame body 6*a* and is configured to pivot about rotation shafts to open or shut the inside of the frame body 6*a* in the front and rear directions. The shutter 6*b* includes a driving controller (not shown) configured to control the opening and closing operation with the shutting fins 6*b*1 by pivoting the shutting fins 6*b*1.

In a predetermined timing, as needed, the grill shutter 6 as described above is controlled to shut or supply to the radiator the wind during traveling that is guided rearward at the duct-shaped air guide member 4 (see FIG. 3) from a position close to the lower opening 12 (see FIG. 1) to which the front lower grill 7 (see FIG. 1) is attached.

As shown in FIG. 3, a left side vertical member **6*a*1 included in the frame body 6*a* of the grill shutter 6 is formed to have a wide width in the vehicle width direction. The width of the left side vertical member 6*a*1 in the vehicle width direction is substantially equal to the width of the sensor protection member 13** in the vehicle width direction described later in detail.

The front surface of the left side vertical member **6*a*1 is formed with a recess R which receives the sensor protection member 13 when, for example, the sensor protection member 13** falls over rearward at the time of a light collision of the vehicle.

The recess R has a shape imitating the shape of the rear surface of the sensor protection member 13.

The recess R will be described with the later-described incliningly falling over operation of the sensor protection member 13.

<<Vehicle Body Front Construction>>

Next, the vehicle body front construction 1 of the present embodiment will be described.

As shown in FIG. 2, the vehicle body front construction 1 of the present embodiment includes the sensor protection member 13 which protects the parking sensor 8 attached to the front bumper 2 by covering the parking sensor 8 from behind.

As shown in FIG. 3, the parking sensor 8 includes the sensor main portion **8*a* having a substantially cylindrical outer shape including a transmitter and a receiver of ultrasound waves therein. The parking sensor 8 includes the connector 8*b* provided to protrude from the rear portion of the sensor main portion 8*a* outward in the vehicle width direction (the left side in FIG. 3**).

Figure 4:
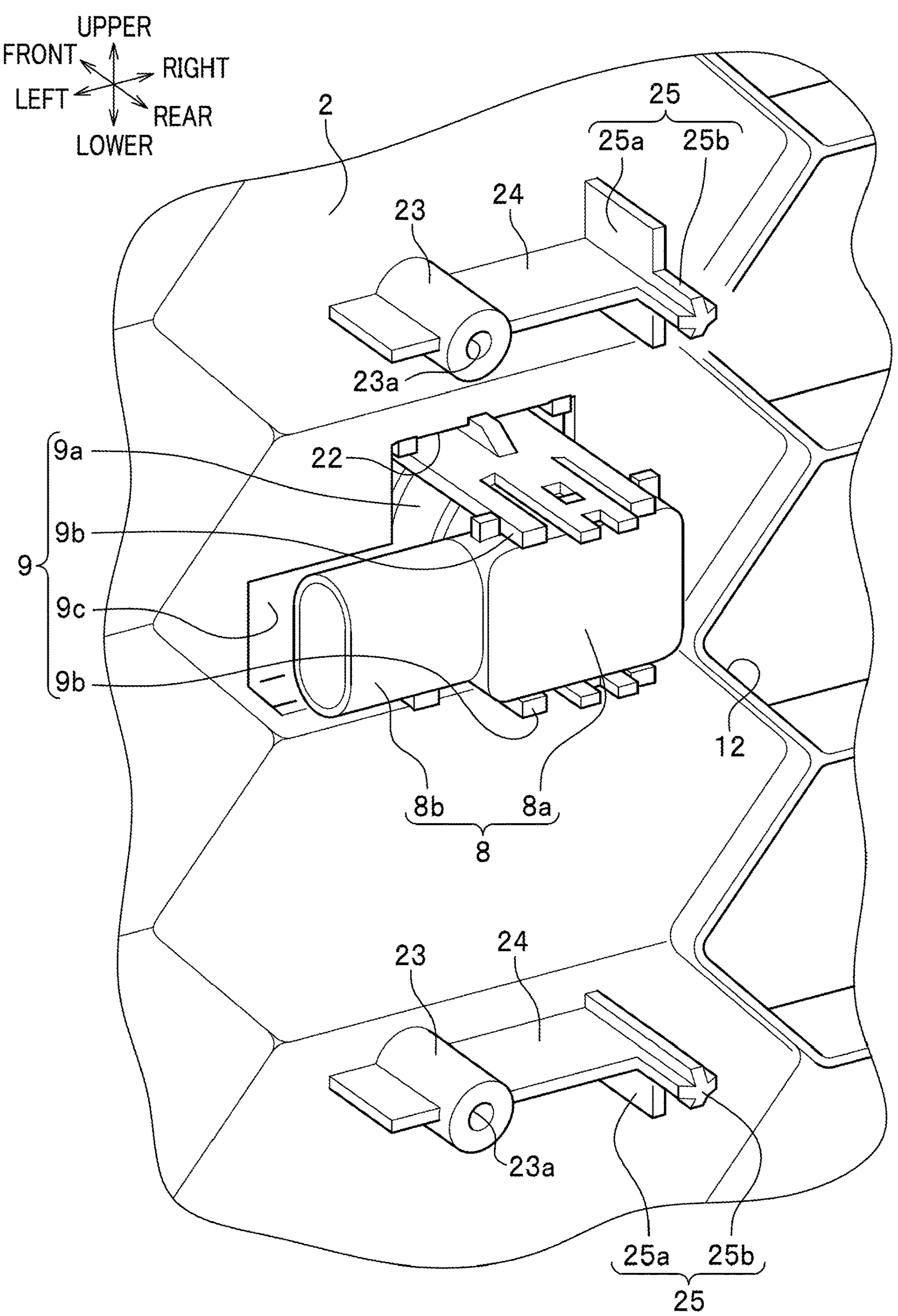
FIG. 4 is a partial enlarged perspective view showing the sensor attached on a back side of a front bumper as viewed from behind on the diagonal left and slightly above.
Figure 5:
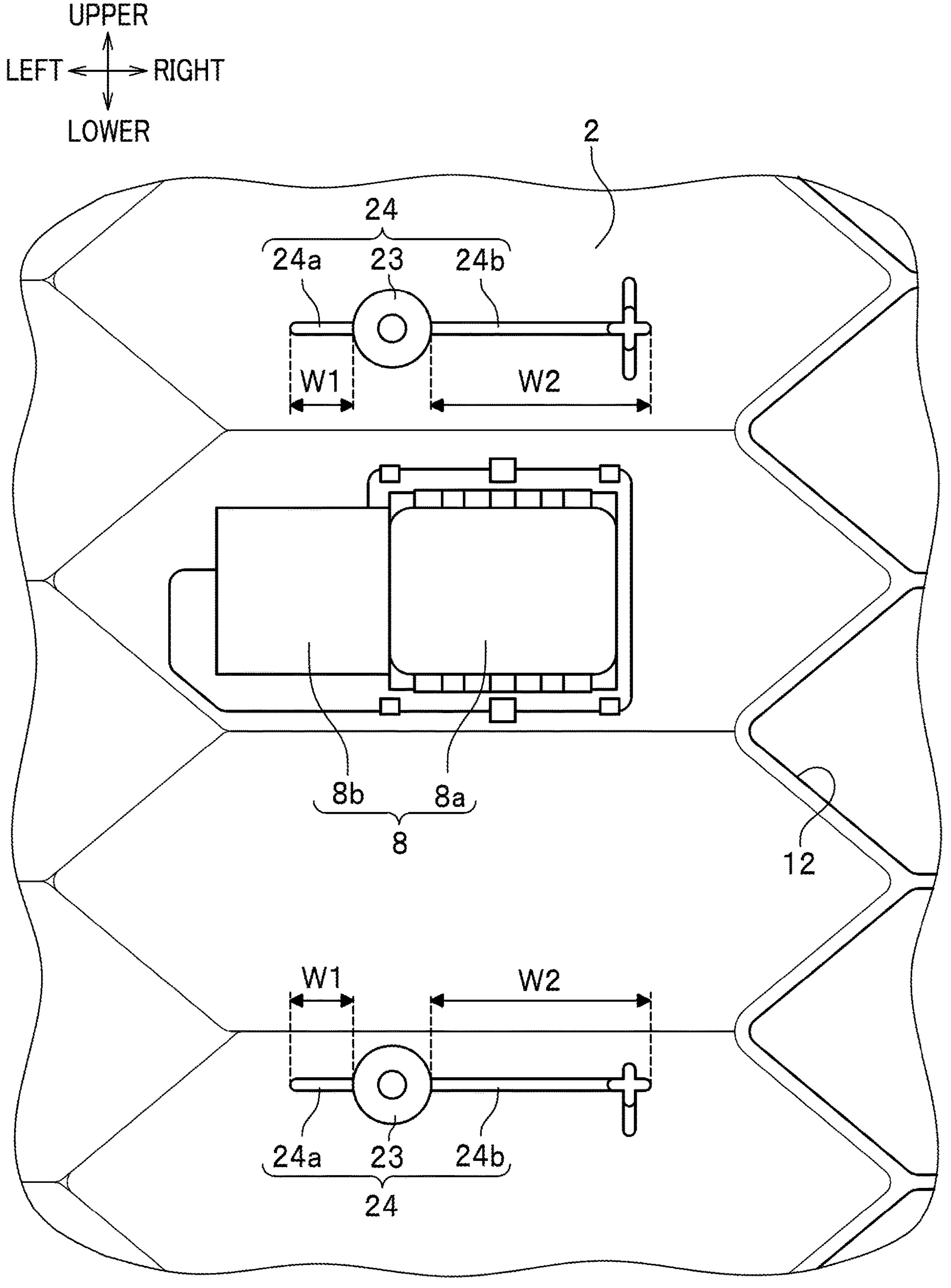
FIG. 5 is a partial enlarged rear view of the front bumper to which the sensor is attached.

FIG. 4 is a partial enlarged perspective view showing the parking sensor 8 attached on the back side of the front bumper 2 as viewed from behind on the diagonal left and slightly above. FIG. 5 is a partial enlarged rear view of the front bumper 2 to which the parking sensor 8 is attached.

Note that, in FIGS. 4 and 5, the reference sign 12 indicates a lower opening provided in the front bumper 2.

As shown in FIG. 4, the parking sensor 8 of the present embodiment is assembled on a sensor holder 9 and also attached to the front bumper 2 using the sensor holder 9.

Incidentally, the sensor holder 9 includes a cylindrical portion **9*a* into which a front portion of the sensor main portion 8*a* in the substantially cylindrical shape is fitted. The senor holder 9 includes a pair of tabs 9*b* pinching the rear portion of the sensor main portion 8*a* from the top and the bottom. The senor holder 9 includes an extending portion 9*c* extending from the rear portion of the sensor main portion 8*a* outward in the vehicle width direction (the left side in FIG. 4) to support the connector 8*b***.

The parking sensor 8 is attached to the front bumper 2 by fitting the sensor holder 9 into an attachment hole 22 of the front bumper 2. In this process, the front portion of the sensor main portion **8*a* is shown in front of the front bumper 2** so as to be able to transmit and receive ultrasound waves.

As shown in FIG. 4, the front bumper 2 includes, on the back surface, an attachment base 23 for attaching the sensor protection member 13 (see FIG. 3) described next, a width-direction extension rib 24, and a positioning portion 25 for the sensor protection member 13 (see FIG. 3).

The attachment base 23, the width-direction extension rib 24, and the positioning portion 25 are each paired in the top and bottom positions sandwiching the parking sensor 8 so as to have a horizontally symmetric structure.

The attachment base 23 has a cylindrical shape protruding from the back surface of the front bumper 2 at a predetermined height. The attachment base 23 is formed with a screw hole **23*a* to screw the sensor protection member 13 (see FIG. 3). Incidentally, the sensor protection member 13 (see FIG. 3) is formed with a screw insertion hole 16 (see FIG. 6A) correspondingly to the attachment base 23**.

The width-direction extension rib 24 is provided to stand on the back surface of the front bumper 2 at the substantially same height as the height of the attachment base 23 and extends to two sides in the vehicle width direction about the attachment base 23.

Specifically, as shown in FIG. 5, the width-direction extension rib 24 includes a vehicle width direction-outer portion **24*a* which is connected to the attachment base 23 and extends outward in the vehicle width direction (the left side in FIG. 5) with a first width W1. The width-direction extension rib 24 includes a vehicle width direction-inner portion 24*b* which is connected to the attachment base 23 and extends inward in the vehicle width direction (the right side in FIG. 5**) with a second width W2 longer than the first width W1.

The vehicle width direction-outer portion **24*a* of the width-direction extension rib 24 extends from the attachment base 23 outward of the sensor main portion 8*a* in the width direction of the vehicle. The vehicle width direction-inner portion 24*b* of the width-direction extension rib 24 extends from the attachment base 23 inward of the sensor main portion 8*a*** in the width direction of the vehicle.

As shown in FIG. 4, the positioning portion 25 includes a rib **25*a* which is provided to stand on the back surface of the front bumper 2 and integrally connected to the end of the width-direction extension rib 24 on the inner side in the vehicle width direction. The positioning portion 25 includes a protrusion 25*b* which has a cross-shaped cross-section and formed at the rear end of the rib 25*a*. Incidentally, the positioning portion 25 determines an attachment position of the sensor protection member 13 to the front bumper 2 by fitting the protrusion 25*b* to an engagement hole 17 (see FIG. 6A) formed in the later-described sensor protection member 13 (see FIG. 6**A).

When the sensor protection member 13 (see FIG. 2) is arranged in a predetermined attachment position with respect to the front bumper 2 (see FIG. 2), a rear end of the width-direction extension rib 24 (see FIG. 6C) is arranged adjacent and close to the sensor protection member 13 (see FIG. 6C) as described later.

Next, the sensor protection member 13 will be described.

Figure 6A:
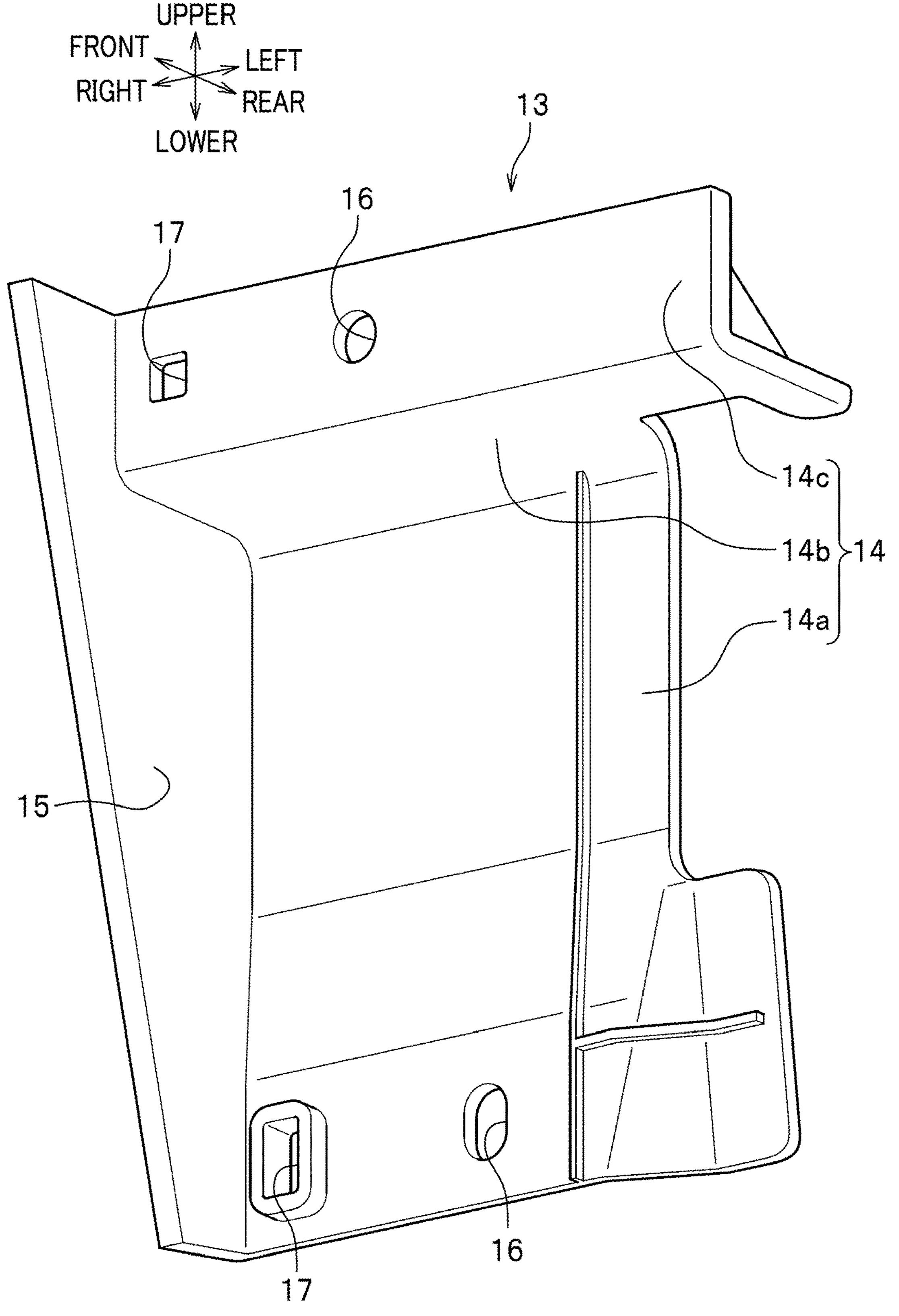
FIG. 6A is an entire perspective view of the sensor protection member.
Figure 6B:
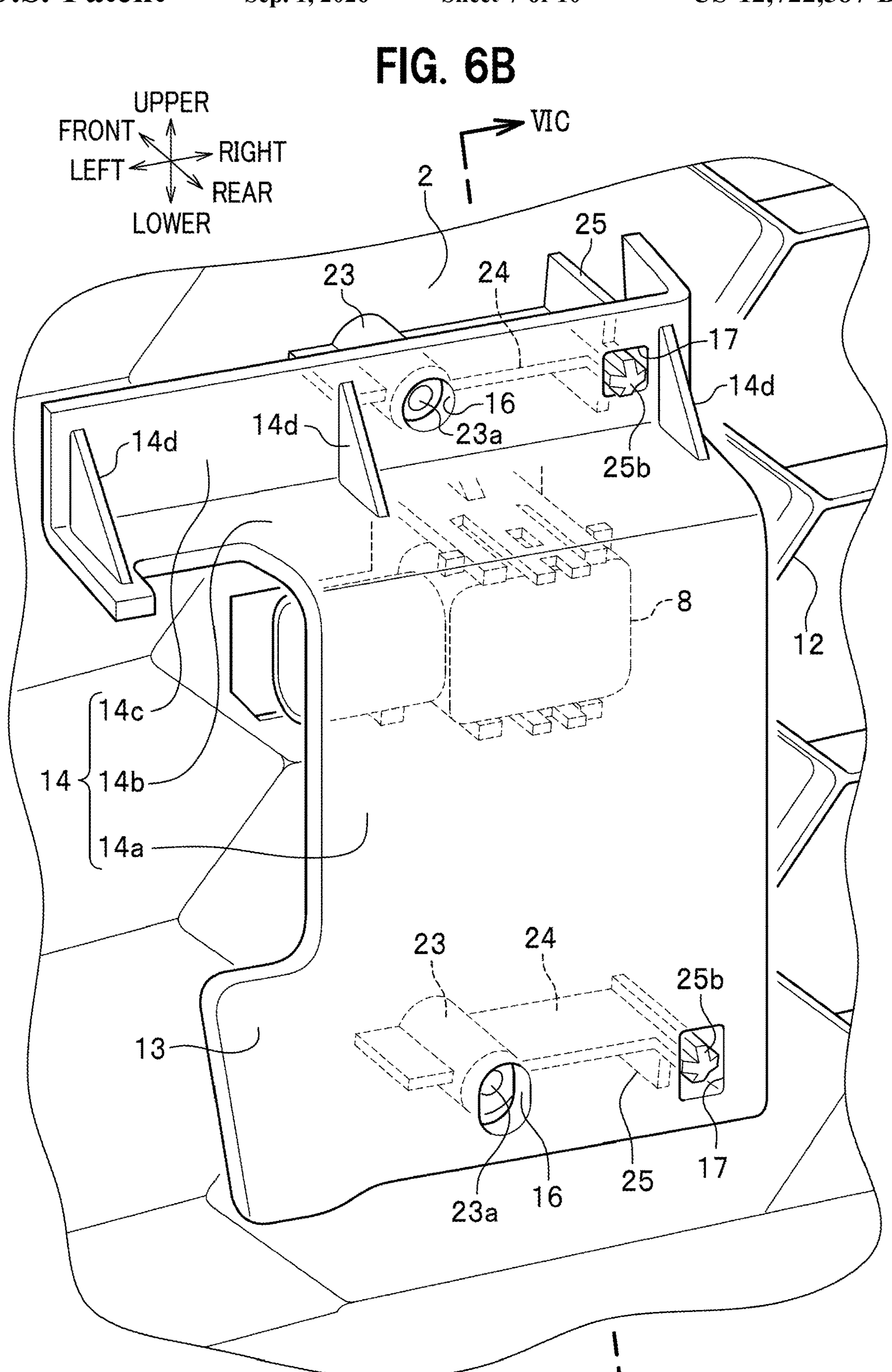
FIG. 6B is a partial enlarged perspective view showing the sensor protection member covering the sensor attached on the back side of the front bumper as viewed from behind on the diagonal left and slightly above.
Figure 6C:
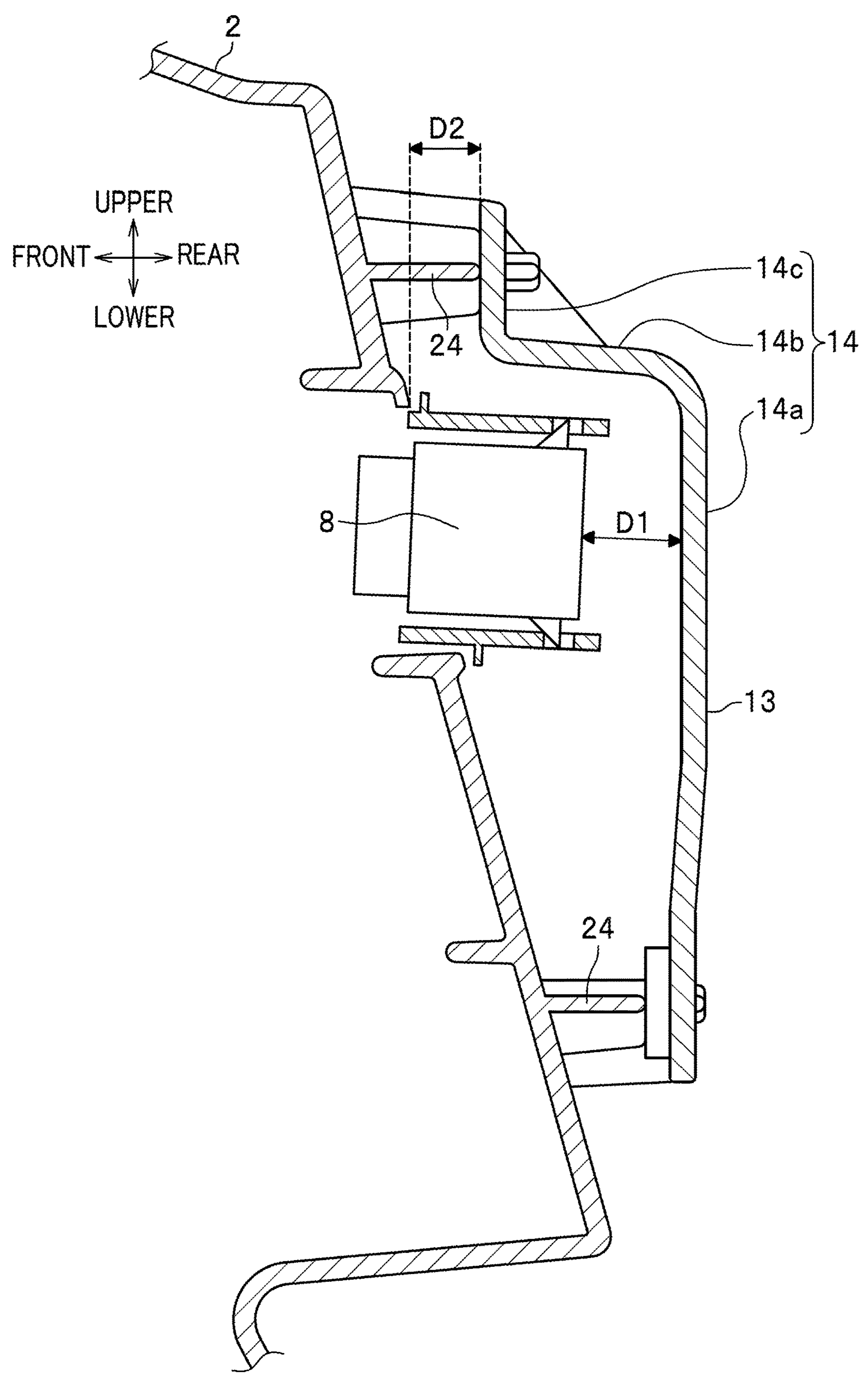
FIG. 6C is a cross-sectional view taken along VIC-VIC of FIG. 6B.

FIG. 6A is an entire perspective view of the sensor protection member 13. FIG. 6B is a partial enlarged perspective view showing the sensor protection member 13 covering the parking sensor 8 attached on the back side of the front bumper 2 as viewed from behind on the diagonal left and slightly above. FIG. 6C is a cross-sectional view taken along VIC-VIC of FIG. 6B.

As shown in FIG. 6A, the sensor protection member 13 is formed of a bent plate body. The sensor protection member 13 of the present embodiment is assumed to be a resin molding having stiffness.

As shown in FIG. 2, the sensor protection member 13 of the present embodiment as described above is assumed to be formed of a thicker plate than the air guide member 4.

As shown in FIG. 6A, the sensor protection member 13 includes a protection wall 14 and a side wall 15.

As shown in FIG. 2, the protection wall 14 extends in the vehicle width direction while forming a clearance between the protection wall 14 and the air guide member 4 (the side plate 4*c* on the left side).

As shown in FIG. 2, the side wall 15 extends forward from the end of the protection wall 14 close to the lower opening 12 of the front bumper 2. The front end of the side wall 15 extends to a position close to the back surface of the front bumper 2.

Note that, in FIG. 6A, the screw insertion hole indicated by the reference numeral 16 is provided correspondingly to the attachment base 23 (see FIG. 4) of the front bumper 2 (see FIG. 4). The engagement hole indicated by the reference sign 17 is provided correspondingly to the protrusion 25*b* (see FIG. 4) of the positioning portion 25 (see FIG. 4) of the front bumper 2.

As shown in FIG. 6B, the protection wall 14 includes a rear wall 14*a* extending in the vehicle width direction behind the parking sensor 8. The protection wall 14 includes an upper wall 14*b* extending substantially horizontally from the upper end of the rear wall 14*a* forward above the parking sensor 8. The protection wall 14 includes a front wall 14*c* extending upward from the front end of the upper wall 14*b*.

The sensor protection member 13 includes a reinforcement rib 14*d* having a planar shape in a right triangle at the internal corner of an internal angle formed by the front wall 14*c* and the upper wall 14*b*.

Note that, although three reinforcement ribs 14*d* of the present embodiment are arranged to be aligned in the vehicle width direction, the number of the reinforcement ribs 14*d* is not limited thereto and may be increased or decreased.

As shown in FIG. 6B, the sensor protection member 13 is positioned with respect to the front bumper 2 by fitting the protrusion 25*b* of the positioning portion 25 of the front bumper 2 into the engagement hole 17 of the sensor protection member 13.

Thus, the screw insertion hole 16 of the sensor protection member 13 is arranged correspondingly to the attachment base 23 of the front bumper 2.

Additionally, the sensor protection member 13 is attached to the front bumper 2 with the screw (not shown) inserted in the screw insertion hole 16 being screwed into the screw hole 23*a* of the attachment base 23.

As shown in FIG. 6C, the lower portion of the front bumper 2 to which the sensor protection member 13 of the present embodiment is attached is inclined to be gradually displaced rearward as being lower.

Meanwhile, the sensor protection member 13 includes the upper wall 14*b* between the front wall 14*c* and the rear wall 14*a* so as to fill a step between the front wall 14*c* and the rear wall 14*a* in the front and rear directions.

Thus, the upper wall 14*b* as a horizontal wall is formed between the front wall 14*c* and the rear wall 14*a* as vertical walls in the sensor protection member 13 attached to the inclined front bumper 2. The rear wall 14*a* as a vertical wall is arranged at a predetermined interval with respect to the parking sensor 8 in the front and rear directions. The upper wall 14*b* as a horizontal wall is arranged at a predetermined interval with respect to the parking sensor 8 in the up and down directions.

As described later, it is desirable to set a separation distance D1 between the rear wall 14*a* and the parking sensor 8 is larger than a separation distance D2 between the front wall 14*c* and the front bumper 2 (D1>D2).

As described above, the rear end of the width-direction extension rib 24 is arranged adjacent to the front wall 14*c* and the rear wall 14*a* in the sensor protection member 13.

Figure 7:
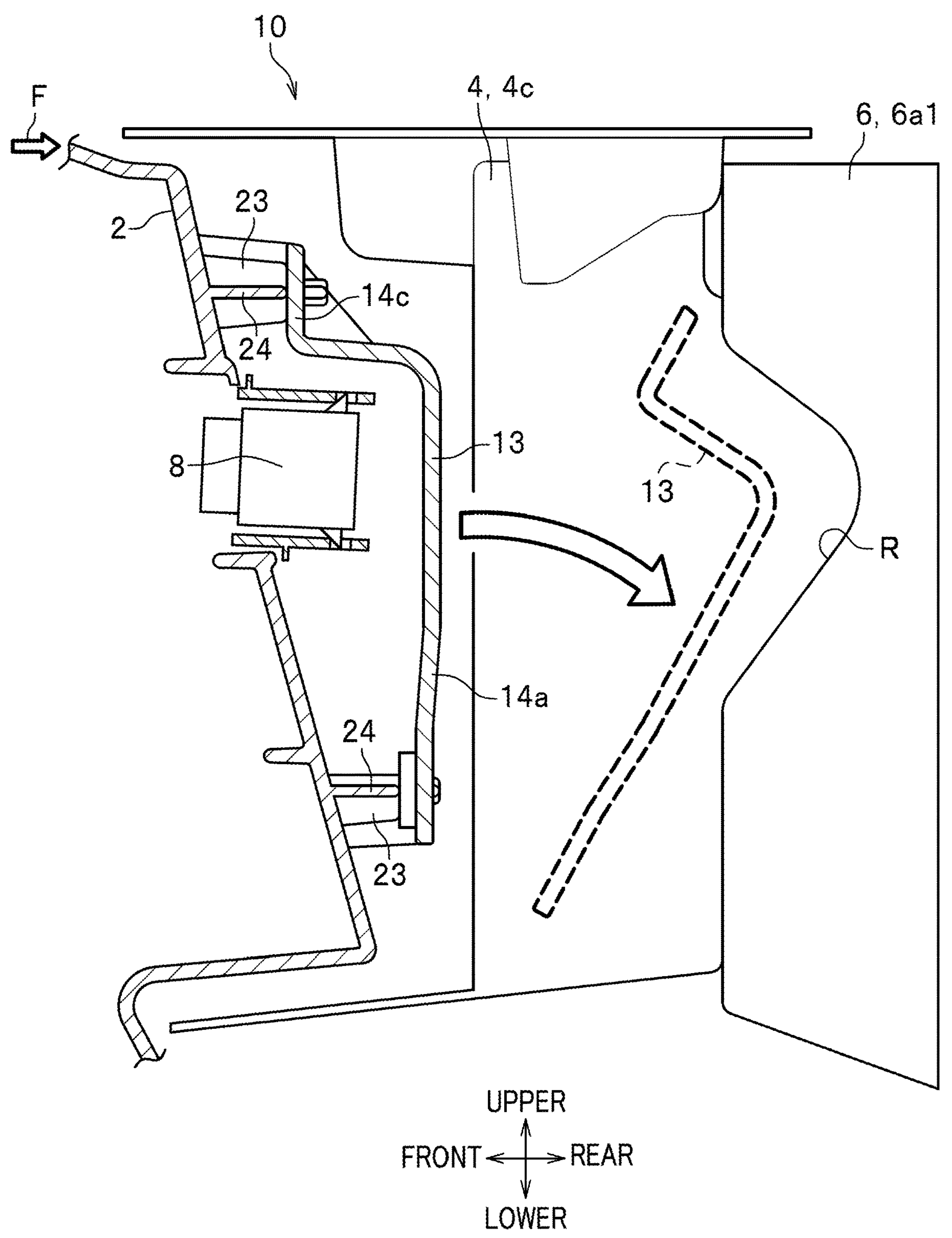
FIG. 7 is an explanatory view of an operation of the sensor protection member when a collision load is inputted from the front of the vehicle body.

FIG. 7 is an explanatory view of an operation of the sensor protection member 13 when a collision load F at the time of a light collision is inputted from the front of the vehicle body 10.

As shown in FIG. 7, when the collision load F is inputted by a colliding object (not shown) brought into contact from the front of the vehicle body 10, the upper portion of the front bumper 2 is brought into contact with the colliding object (not shown) prior to the lower portion thereof since the front bumper 2 on which the sensor protection member 13 is arranged is inclined as described above. Thus, the sensor protection member 13 attached to the front bumper 2 pivots with the front bumper 2 in a direction of an open arrow shown in FIG. 7. Specifically, a portion of protection wall 14 closer to the front wall 14*c* pivots rearward about the lower portion of the rear wall 14*a*.

In this process, the sensor protection member 13 is hit on the side plate 4*c* (see FIG. 2) of the air guide member 4 on the left side.

As described above, the air guide member 4 is formed of an elastic body such as flexible resin and synthetic rubber in contrast to the sensor protection member 13 formed of a resin molding having stiffness. As described above, the sensor protection member 13 is formed of a thicker plate than the air guide member 4.

Thus, the sensor protection member 13 to which the collision load F is inputted inclininglyfalls over toward the left side vertical member 6*a*1 of the grill shutter 6 while deforming the air guide member 4 as indicated by a dotted line in FIG. 7.

The falling over sensor protection member 13 is then stored in the recess R of the left side vertical member 6*a*1 imitating the shape of the rear surface of the sensor protection member 13.

Operation and Effect

Hereinafter, operation and effect achieved by the vehicle body front construction 1 of the present embodiment will be described.

In the vehicle body front construction 1 of the present embodiment, the sensor protection member 13 is arranged between the parking sensor 8 (the sensor) and the air guide member 4. The sensor protection member 13 protects the parking sensor 8 (the sensor) attached to the front bumper 2 from behind the parking sensor 8.

According to the vehicle body front construction 1 as described above, unlike the conventional structure that protects a sensor by limiting a retraction width of a bumper toward a bumper beam (for example, see JP2009-208500A), it is possible to protect the parking sensor 8 without impairing the degree of freedom in the design of the front bumper 2.

In the vehicle body front construction 1, the sensor protection member 13 includes the protection wall 14 extending in the vehicle width direction behind the parking sensor 8.

According to the vehicle body front construction 1 as described above, it is possible to avoid direct contact between the air guide member 4 and the parking sensor 8 at the protection wall 14 at the time of a light collision. Thus, in the vehicle body front construction 1, it is possible to arrange the parking sensor 8 and the air guide member 4 close to each other, and the degree of freedom in the design is enhanced.

In the vehicle body front construction 1, the sensor protection member 13 includes the side wall 15 extending forward from the end of the protection wall 14 on the side of the lower opening 12 of the front bumper 2.

According to the vehicle body front construction 1 as described above, it is possible to guide the outside air taken from the lower opening 12 to the air guide member 4 behind at the side wall 15. Thus, in the vehicle body front construction 1, the air guiding function between the lower opening 12 of the front bumper 2 and the air guide member 4 is not impaired even in a vehicle in which the parking sensor 8 is arranged between the front bumper 2 and the air guide member 4. Additionally, the parking sensor 8 is protected further reliably at the side wall 15.

In the vehicle body front construction 1, the sensor protection member 13 includes the reinforcement rib 14*d* at the corner on the internal angle side formed by the front wall 14*c* and the upper wall 14*b*.

According to the vehicle body front construction 1 as described above, it is possible to reduce deformation of the front wall 14*c* and the upper wall 14*b* by the reinforcement rib 14*d* when the collision load at the time of a light collision is inputted to the sensor protection member 13. Thus, the vehicle body front construction 1 prevents the deformed sensor protection member 13 from being brought into contact with the parking sensor 8 and further reliably prevents damage of the parking sensor 8 at the time of a light collision.

In the vehicle body front construction 1, the sensor protection member 13 is formed of a thicker plate than the air guide member 4.

According to the vehicle body front construction 1 as described above, the sensor protection member 13 is prevented from being deformed even when the sensor protection member 13 is pushed rearward and brought into contact with the air guide member 4 at the time of a light collision. Thus, the vehicle body front construction 1 prevents the deformed sensor protection member 13 from being brought into contact with the parking sensor 8 and further reliably prevents damage of the parking sensor 8 at the time of a light collision.

In the vehicle body front construction 1, the recess R that receives the sensor protection member 13 pushed rearward and incliningly falling over at the time of a light collision is formed on the frame body 6*a* (the left side vertical member 6*a*1) of the grill shutter 6.

According to the vehicle body front construction 1 as described above, the sensor protection member 13 pushed rearward at the time of a light collision is stored in the recess R, and thus it is possible to prevent the sensor protection member 13 displaced rearward from being damaged due to contact with another member (including the left side vertical member 6*a*1).

In the vehicle body front construction 1, the sensor protection member 13 is fixed on the attachment bases 23 formed above and below the parking sensor 8.

According to the vehicle body front construction 1 as described above, the attachment bases 23 prevent the protection region of the parking sensor 8 formed between the sensor protection member 13 and the front bumper 2 from collapsing with the collision load. Thus, the vehicle body front construction 1 further reliably prevents damage of the parking sensor 8 at the time of a light collision.

The vehicle body front construction 1 includes the width-direction extension rib 24 which is provided to stand on the back surface of the front bumper 2 and connected to the attachment base 23.

According to the vehicle body front construction 1 as described above, it is possible to reinforce the attachment base 23 at the width-direction extension rib 24.

In the vehicle body front construction 1, the rear end of the width-direction extension rib 24 extending rearward from the back surface of the front bumper 2 is arranged adjacent to or close to the sensor protection member 13. The width-direction extension rib 24 is formed to extend inward of the sensor main portion 8*a* in the vehicle width direction and also formed to extend outward of the sensor main portion 8*a* in the vehicle width direction.

According to the vehicle body front construction 1 as described above, when the collision load is inputted, the rear end of the width-direction extension rib 24 is brought into contact with the sensor protection member 13 across a wide range in the vehicle width direction. Thus, the collision load inputted to the sensor protection member 13 through the width-direction extension rib 24 is distributed. Deformation of the sensor protection member 13 due to the collision load is prevented, and collapsing of the protection region of the parking sensor 8 formed between the sensor protection member 13 and the front bumper 2 is prevented. The vehicle body front construction 1 further reliably prevents damage of the parking sensor 8 at the time of a light collision.

The present embodiment is described above; note that, the present invention is not limited to the above-described embodiment and can be implemented in various modes.

In the above-described embodiment, the attachment bases 23 and the width-direction extension ribs 24 are assumed to be arranged above and below the parking sensor 8 (see FIG. 5). However, the positions of the attachment bases 23 and the width-direction extension ribs 24 are not limited thereto.

Specifically, although it is not shown in the drawing, the attachment bases 23 and the width-direction extension ribs 24 may have a configuration to be arranged in positions away from the parking sensor 8 in the vehicle width direction.

According to the vehicle body front construction 1 of the modification described above, the degree of freedom in the layout related to the arrangement of the attachment bases 23 and the width-direction extension ribs 24 is further enhanced.

Figure 8:
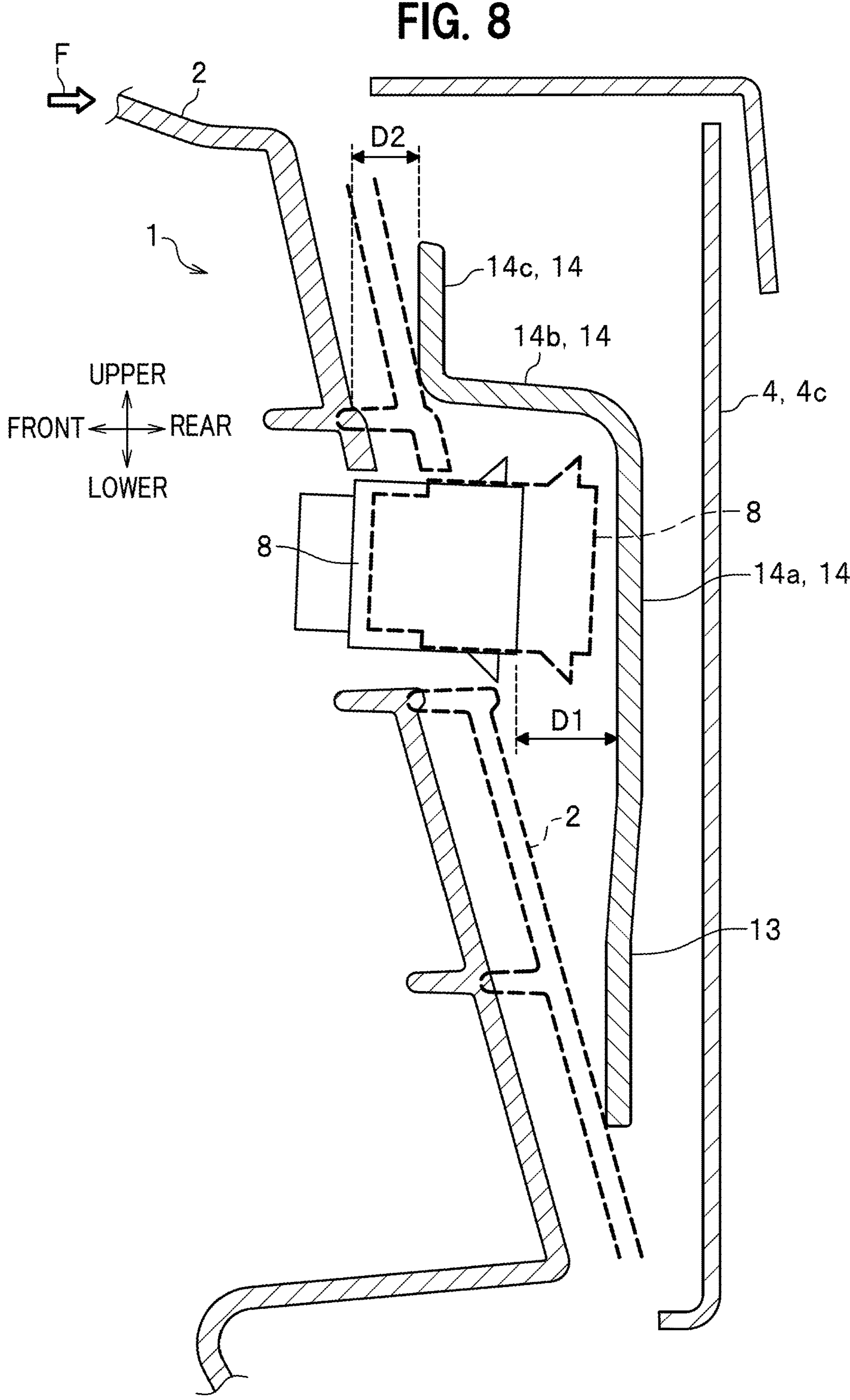
FIG. 8 is an explanatory view of an operation which allows the sensor protection member to bring into contact with the front bumper prior to the sensor in the sensor protection member.

FIG. 8 is an explanatory view of an operation to bring the front bumper 2 into contact with the sensor protection member 13 prior to the parking sensor 8 in the sensor protection member 13 of the vehicle body front construction 1 according to the modification as described above.

In the vehicle body front construction 1 according to the modification as described above, as shown in FIG. 8, the separation distance D1 between the rear wall 14*a* and the parking sensor 8 is wider than the separation distance D2 between the front wall 14*c* and the front bumper 2.

According to the vehicle body front construction 1 as described above, the front bumper 2 is brought into contact with the sensor protection member 13 prior to the parking sensor 8 at the time of a light collision as indicated by a dotted line in FIG. 8.

That is, when the front wall 14*c* is pushed rearward by the front bumper 2, the rear wall 14*a* is pushed rearward without deformation of the upper wall 14*b*. Thus, the parking sensor 8 is pushed rearward without interference with the rear wall 14*a*, and thus damage of the parking sensor 8 due to interference of the rear wall 14*a* is avoided.

What is claimed is:

1. A vehicle body front construction comprising:

a front bumper including an opening;

an air guide member disposed behind the front bumper and configured to guide rearward outside air taken from the opening;

a sensor attached to the front bumper; and a sensor protection member disposed between the sensor and the air guide member, wherein the sensor protection member comprises:

a protection wall extending in a width direction of a vehicle with a clearance between the sensor protection member and the air guide member; and a side wall extending forward of the vehicle from an end of the protection wall close to the opening, the side wall including a front end positioned close to a back surface of the front bumper, wherein the protection wall comprises:

a rear wall extending in the width direction behind the parking sensor;

an upper wall extending substantially horizontally from an upper end of the rear wall forward above the sensor; and a front wall extending upward from a front end of the upper wall, and wherein the rear wall and the sensor have a distance therebetween larger than a distance between the front wall and the front bumper.

2. The vehicle body front construction according to claim 1, wherein the sensor protection member includes a reinforcement rib at an internal corner made by the front wall and the upper wall.

3. The vehicle body front construction according to claim 1, wherein the sensor protection member is thicker than the air guide member.

4. The vehicle body front construction according to claim 2, wherein the sensor protection member is fixed on attachment bases extending rearward from a back surface of the front bumper, and wherein the attachment bases are disposed above and below the sensor respectively.

5. The vehicle body front construction according to claim 4, wherein the front bumper comprises a width-direction extension rib extending from one of the attachment bases in the width direction, wherein the width-direction extension rib has an end in a rearward direction of the vehicle, the end being disposed adjacent to the sensor protection member, wherein the width-direction extension rib extends from the one of the attachment bases inward and outward of a main body of the sensor in the width direction of the vehicle.

6. A vehicle body front construction comprising:

a front bumper including an opening;

an air guide member disposed behind the front bumper and configured to guide rearward outside air taken from the opening;

a sensor attached to the front bumper; and a sensor protection member disposed between the sensor and the air guide member, wherein the sensor protection member comprises:

a protection wall extending in a width direction of a vehicle with a clearance between the sensor protection member and the air guide member; and a side wall extending forward of the vehicle from an end of the protection wall close to the opening, the side wall including a front end positioned close to a back surface of the front bumper, and wherein the vehicle body front construction further comprises a grill shutter disposed behind the air guide member, the grill shutter including a frame body having a recess configured to receive the sensor protection member moved rearward upon a collision.

7. A vehicle body front construction comprising:

a front bumper including an opening therethrough, the opening extending frontward of a vehicle;

an air guide member disposed behind the front bumper and configured to guide rearward outside air taken from the opening;

a sensor attached to the front bumper; and a sensor protection member disposed between the sensor and the air guide member, the sensor protection member comprising:

a protection wall extending in a width direction of the vehicle with a clearance between the sensor protection member and the air guide member, the protection wall including a left end and a right end in the width direction with the right end closer to the opening than the left end; and a side wall extending forward of the vehicle from the right end of the protection wall, the side wall including a proximal rear end and a distal front end positioned closer to a back surface of the front bumper than the proximal rear end.

* * * * *